United States Patent [19]
Tayloe

[11] Patent Number: 5,592,175
[45] Date of Patent: Jan. 7, 1997

[54] LOCATION DETERMINATION METHOD AND APPARATUS FOR A COMMUNICATION UNIT

[75] Inventor: Daniel R. Tayloe, Phoenix, Ariz.

[73] Assignee: Motorola, Inc., Schaumburg, Ill.

[21] Appl. No.: 519,869

[22] Filed: Aug. 25, 1995

[51] Int. Cl.⁶ ............................................. G01S 5/02
[52] U.S. Cl. ..................... 342/357; 455/12.1; 342/352
[58] Field of Search ................................ 342/357, 352; 455/12.1, 13.1

[56] References Cited

U.S. PATENT DOCUMENTS

| | | | |
|---|---|---|---|
| 3,906,204 | 9/1975 | Rigdon et al. | 235/150.27 |
| 4,240,075 | 12/1980 | Zhilin | 343/100 ST |
| 4,740,792 | 4/1988 | Sagey et al. | 342/457 |
| 4,975,707 | 12/1990 | Smith | 342/357 |
| 4,979,170 | 12/1990 | Gilhousen et al. | 370/104.1 |
| 5,483,664 | 1/1996 | Moritz et al. | 455/13.1 |

Primary Examiner—Thomas H. Tarcza
Assistant Examiner—Dao L. Phan
Attorney, Agent, or Firm—Sherry J. Whitney

[57] ABSTRACT

In a communication system (10) having at least one communication unit (26) (CU) and at least one satellite (12, 170) which projects communication cells (176, 180) toward the CU (26), a method for determining a CU's location involves identifying (202) optimal communication cells (180) in which an intersection (112) between a time delay contour (106) and a Doppler contour (103) falls below an acceptable level, informing (206) the CU (26) to contact a location determination unit (330) when the CU (26) is within an optimal communication cell (180), and determining (212) the CU position at that time. Additionally, the method can achieve a better approximation of the CU position by calculating (244) a CU position relative to a second CU, and/or by using (282–290) a direction-finding unit to more accurately locate the CU (26).

19 Claims, 7 Drawing Sheets

LOCATION DETERMINATION METHOD AND APPARATUS FOR A COMMUNICATION UNIT

FIELD OF THE INVENTION

The present invention relates generally to determining a location of a remote unit using a moving device, and more particularly to locating a ground terminal using an orbiting satellite.

BACKGROUND OF THE INVENTION

Determining a location of a remote radio-communication unit is useful in many applications. For example, location apparatuses and algorithms are useful for rescue operations, locating kidnapping victims, and retrieving stolen property.

Prior art location methods rely on triangularizing a signal from the radio-communication device to determine its position. One method of triangularization involves using multiple antennas whose positions are known to receive a signal transmitted by the radio-communication device. The difference between the times of receipt of the signal by the multiple antennas is used to calculate the location of the radio-communication device. A drawback to this prior-art method is that the area within which a radio-communication device can be located is limited by the coverage of the antennas. Having a sufficient amount of antennas for a system that services a large area is likely to be cost-prohibitive.

Another method of triangularizing involves the use of geolocation equipment associated with the radio-communication device. The geolocation equipment determines the coordinates of the device using geolocation satellites, and those coordinates can be transmitted by the radio-communication device to a receiver. Using geolocation has the advantage of achieving a very accurate position determination. However, geolocation equipment can be prohibitively expensive for some applications. For example, position determination can be offered as a non-essential option for a radio-communication device such as a cellular telephone. Adding the cost of geolocation equipment would drastically reduce the potential market for the cellular telephone.

Another method of determining location involves determining signal delay and Doppler effects between the radio-communication unit and a moving object. The signal delay and Doppler effects can then be used to roughly locate the radio-communication device. The advantage to this method is that position determination can be made at relatively low cost (i.e., no additional equipment is needed). However, the method leads to less accurate results due to left/right ambiguity and error inherent in the signal delay and Doppler measurements.

What are needed are a low-cost apparatus and method for accurately determining the location of a radio-communication unit.

DETAILED DESCRIPTION OF THE DRAWINGS

The present invention provides a low-cost method and apparatus for accurately determining a location of a communication unit. In summary, the method and apparatus of the present invention determines a first approximation of the communication unit location using constant Doppler and constant delay contours when the communication unit is located in a satellite's cells having minimal positional ambiguities. A first approximation of the location may be refined using a second communication unit and/or a direction-finding unit positioned in proximity to the fast approximation of the communication unit location.

Figure 1:
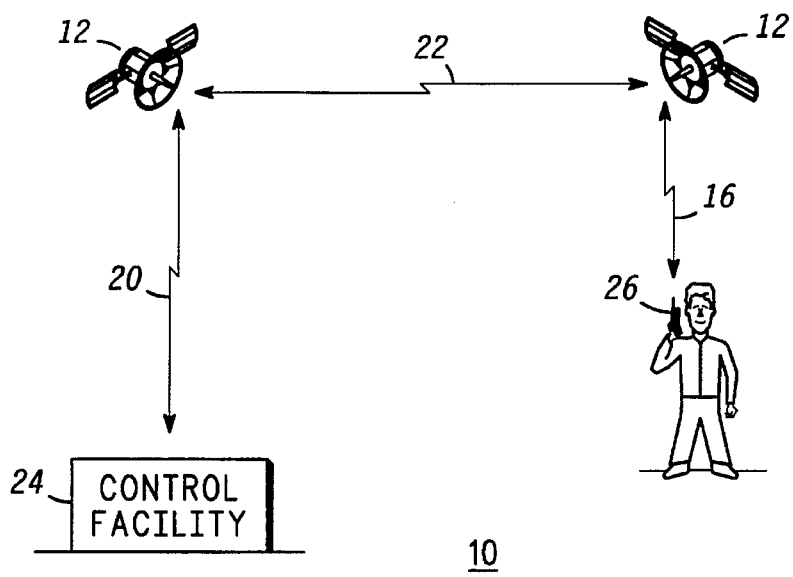
FIG. 1 illustrates a satellite communication system in accordance with a preferred embodiment of the present invention.

FIG. 1 illustrates a satellite communication system 10 in accordance with a preferred embodiment of the present invention. Communication system 10 includes control facility 24, orbiting satellites 12, and communication unit 26. Satellites 12 occupy orbits that can be low-earth orbits, medium-earth orbits, or a combination thereof. In a preferred embodiment, communications system 10 uses six polar orbital planes, with each orbital plane holding eleven satellites 12 for a total of sixty-six satellites 12. However, sixty-six satellites 12 are not essential, and more or fewer satellites 12, or more or fewer orbital planes can be used. For clarity, FIG. 1 illustrates only two satellites 12. However, only one satellite 12 is necessary to carry out the method of the present invention.

Satellites 12 communicate with terrestrial equipment which can be any number of communication units 26, control facility 24, other satellites 12, and possibly other communication devices (not shown). Communication link 16 between satellite 12 and communication unit 26 is accomplished by using communication cells projected by the satellites 12 toward the earth. Communication link 20 between satellite 12 and control facility 24 is accomplished by using a direct radio-frequency or optical link. Communication link 22 between satellites 12 are referred to herein as "cross-links" and may not be required where a single satellite 12 is geographically capable of communicating with both a communication unit 26 and a control facility 24.

A communication unit 26 (CU) can be, for example, a hand-held, portable cellular telephone adapted to transmit data to and/or receive data from satellites 12. A CU 26 can also be a facsimile device, pager, data terminal or any other type of communication device.

A control facility 24 (CF) is an equipment facility, typically ground-based, that is capable of interfacing with satellites 12. CF 24 may communicate directly with satellites 12, or may communicate via remote or co-located ground stations (not shown).

Multiple CFs 24 can exist within communication system 10, each capable of providing different functions. Some CFs 24 connect with ground-based equipment such as, for example, a public switched telephone network (PSTN) (not shown). The same or other CFs 30 control operations of communication system 10.

In a preferred embodiment, CF 24 contains a location determination unit (FIG. 11) which determines a first approximation of a CU location using constant Doppler and constant delay contours when the CU is located in a satellite's cells having minimal positional ambiguities. In an alternate embodiment, the location determination unit can be located within a satellite 12. Determination of the CU location is described in detail in conjunction with FIGS. 6–9.

Only one of CF 24 and CU 26 are shown in FIG. 1 for clarity and ease of understanding. In alternate embodiments, additional system facilities may be desirable, depending upon the requirements of the communication system.

Figure 2:
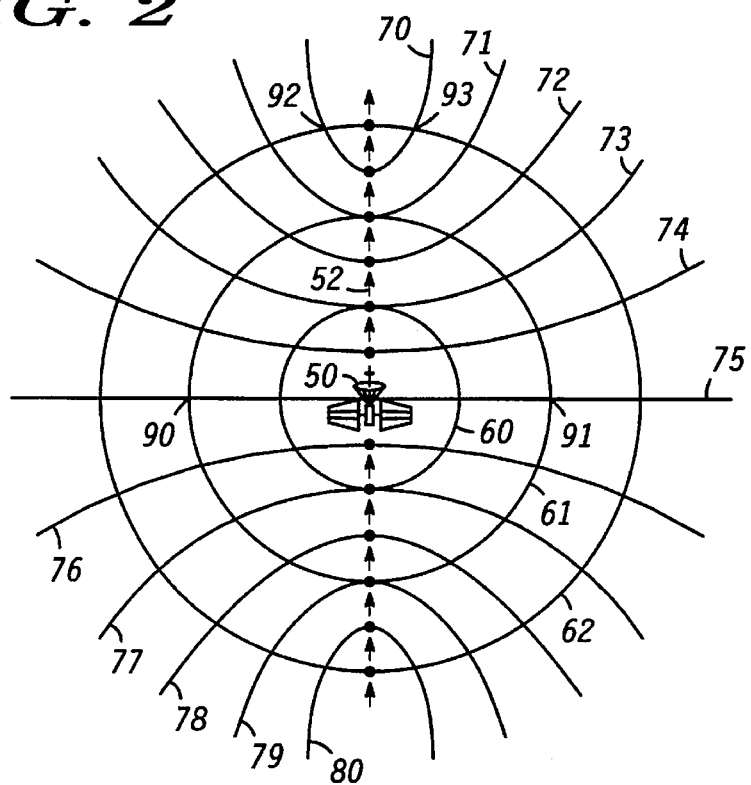
FIG. 2 illustrates constant delay and constant Doppler contours for an orbiting satellite in accordance with a preferred embodiment of the present invention.

FIG. 2 illustrates constant delay and constant Doppler contours for an orbiting satellite 50 in accordance with a preferred embodiment of the present invention. Satellite 50 travels in direction 52. Each of the constant delay contours 60–62 represent all points having an equal delay for a signal transmitted by satellite 50. Each of the constant Doppler contours 70–80 represent all points having same Doppler readings. For example, all points along Doppler contour 75 have a Doppler reading of zero because Doppler contour 75 extends at right angles from the direction vector 52 of satellite 50. The Doppler contour 75 extending at right angles from the direction vector 52 is referred to herein as the "right-angle Doppler contour". Points along Doppler contours 70–74 would have positive Doppler readings because satellite 50 is traveling toward those points. Points along Doppler contours 76–80 would have negative Doppler readings because satellite 50 is traveling away from those points.

Each constant delay contour 60–62 intersects a Doppler contour 70–80 at two points (except where there is a tangential intersection). For example, constant delay contour 61 intersects right-angle Doppler contour 75 at points 90 and 91. Similarly, constant delay contour 62 intersects Doppler contour 70 at points 92 and 93. Because the contours intersect at two points, position determination based on a calculation of the intersection of the contours has an inherent "left-right" ambiguity. In other words, without additional information, the system cannot determine at which intersection point the communication unit is located.

Additional errors in position determination exist because both the signal delay measurement and the Doppler measurement have a certain amount of error. Error can also be introduced where a satellite's station-keeping requirements allow the satellite to drift slightly relative to its optimal position in orbit. The effect of these errors is illustrated in FIG. 3.

Figure 3:
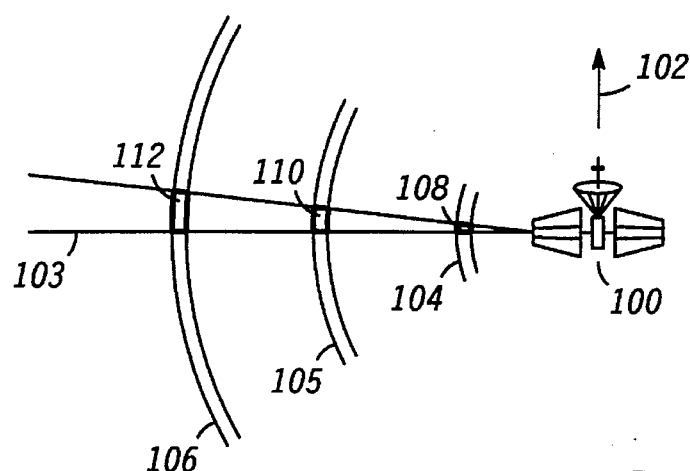
FIG. 3 illustrates position resolution error for constant delay contours and a right-angle Doppler contour in accordance with a preferred embodiment of the present invention.

FIG. 3 illustrates position resolution error for constant delay contours and a right-angle Doppler contour in accordance with a preferred embodiment of the present invention. Satellite 100 is shown traveling in direction 102. Band 103 represents a right-angle Doppler contour having a certain amount of positional resolution error. Bands 104–106 represent constant delay contours also having certain amounts of location resolution errors. Intersection areas 108, 110, and 112 represent the minimum resolution of position determination that can be achieved by the communication system. As will be illustrated in FIG. 4, the size of intersection areas 108, 110, and 112 depends on the Doppler contour chosen for the position determination calculation.

Figure 4:
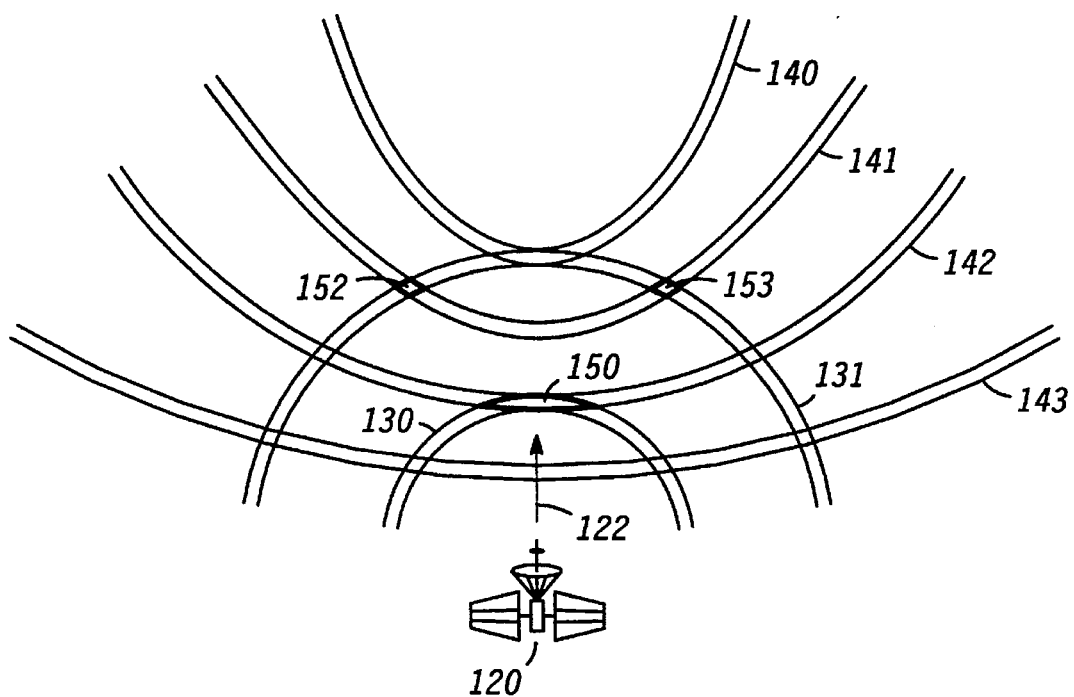
FIG. 4 illustrates position resolution error for constant delay and constant Doppler contours having a substantially parallel intersection in accordance with a preferred embodiment of the present invention.

FIG. 4 illustrates position resolution error for constant delay and constant Doppler contours having a substantially parallel intersection in accordance with a preferred embodiment of the present invention. Satellite 120 is shown traveling in direction 122. Bands 140–143 represent Doppler contours having certain amounts of positional resolution error. Bands 130–131 represent constant delay contours also having certain amounts of positional resolution errors. Intersection area 150 represents the minimum resolution of position determination that can be achieved by the communication system where the Doppler contour 142 and the constant delay contour 130 intersect at one point. As can be observed by comparing intersection area 150 with intersection areas 108, 110, and 112 of FIG. 3, intersection area 150 is significantly larger even though the positional resolution errors of the Doppler contours and the constant delay contours are approximately equal. Because intersection area 150 is significantly larger, a less accurate determination of the location of a communication unit is achievable.

Intersection areas 152 and 153 represent the minimum resolution of position determination that can be achieved by the communication system where the Doppler contour 141 and the constant delay contour 131 intersect at two points. Not only is there ambiguity as to location within the intersection areas 152, 153, but there is also left-right ambiguity due to the fact that two intersections exist. Without more information, the system would be unable to determine in which intersection area 152, 153 the communication unit is located.

Figure 5:
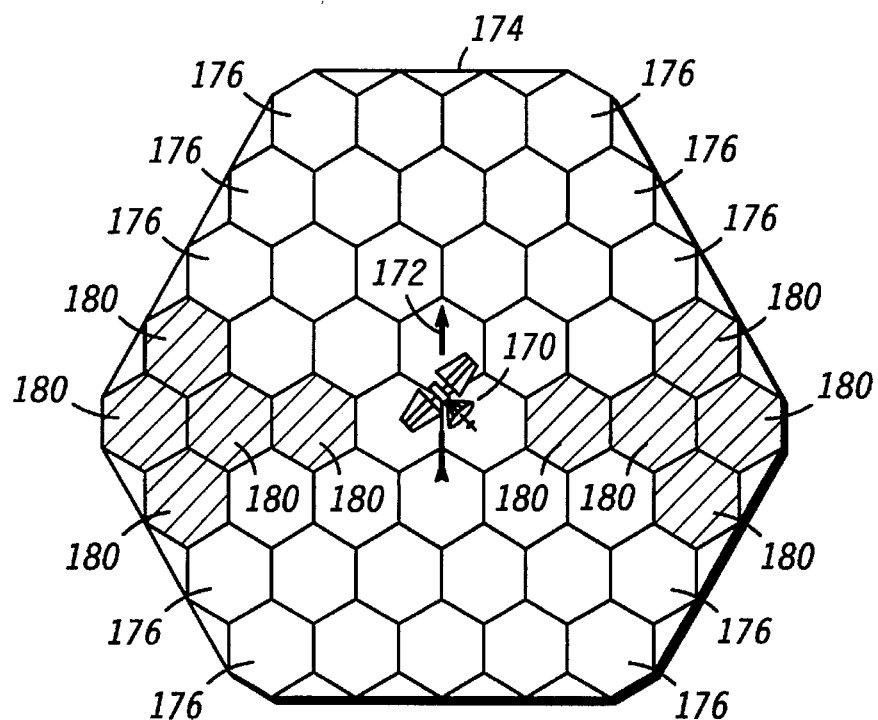
FIG. 5 illustrates communication cells projected on the surface of the earth by a satellite in accordance with a preferred embodiment of the present invention.

FIG. 5 illustrates communication cells projected on the surface of the earth by a satellite in accordance with a preferred embodiment of the present invention. Satellite 170 is shown traveling in direction 172. Satellite 170 projects a "footprint" 174 toward the earth which contains communication cells 176, 180. In alternate embodiments, different numbers of communication cells can be used.

CUs (e.g., CU 26, FIG. 1 ) contact the satellite 170 using channels allocated to each communication cell 176, 180. Thus, the satellite 170 can determine in which communication cell 176, 180 the CU is located. This determination leads to a rough approximation of the location of the CU. However, the area of a single communication cell 176, 180 can be, for example, 400 square kilometers or more. Position determination to that degree of resolution is unacceptable for locating the CU. Therefore, the system must perform more accurate position determination.

In a preferred embodiment, the communication system determines which cells 176, 180 are considered optimal or non-optimal for position determination of a communication unit located within the cells 176, 180. Communication cells 176 are considered to be "non-optimal" communication cells for determining a position of a communication unit. As was illustrated in FIGS. 3 and 4, the position resolution ambiguity increases as the Doppler contours diverge from the right-angle Doppler contour 75 (FIG. 2). Shaded communication cells 180 are considered to be "optimal" communication cells for determining a position of a communication unit because the Doppler contours are close to the right-angle Doppler contour. The determination of which communication cells 180 will be considered optimal depends on the amount of position resolution error the system is willing to tolerate. How much error the system will tolerate depends on the desired position resolution. If more error is acceptable, cells farther away from the right-angle Doppler contour can be considered optimal communication cells. In alternate embodiments, more or fewer communication cells can be chosen as optimal communication cells 180.

Not only is the system capable of determining position to a greater degree of accuracy by employing optimal communication cells 180, but error resulting from left-right ambiguity is also eliminated by using optimal communication cells 180. The system can determine which optimal communication cell 180 the CU is located within, thus left-right ambiguity is eliminated.

Figure 6:
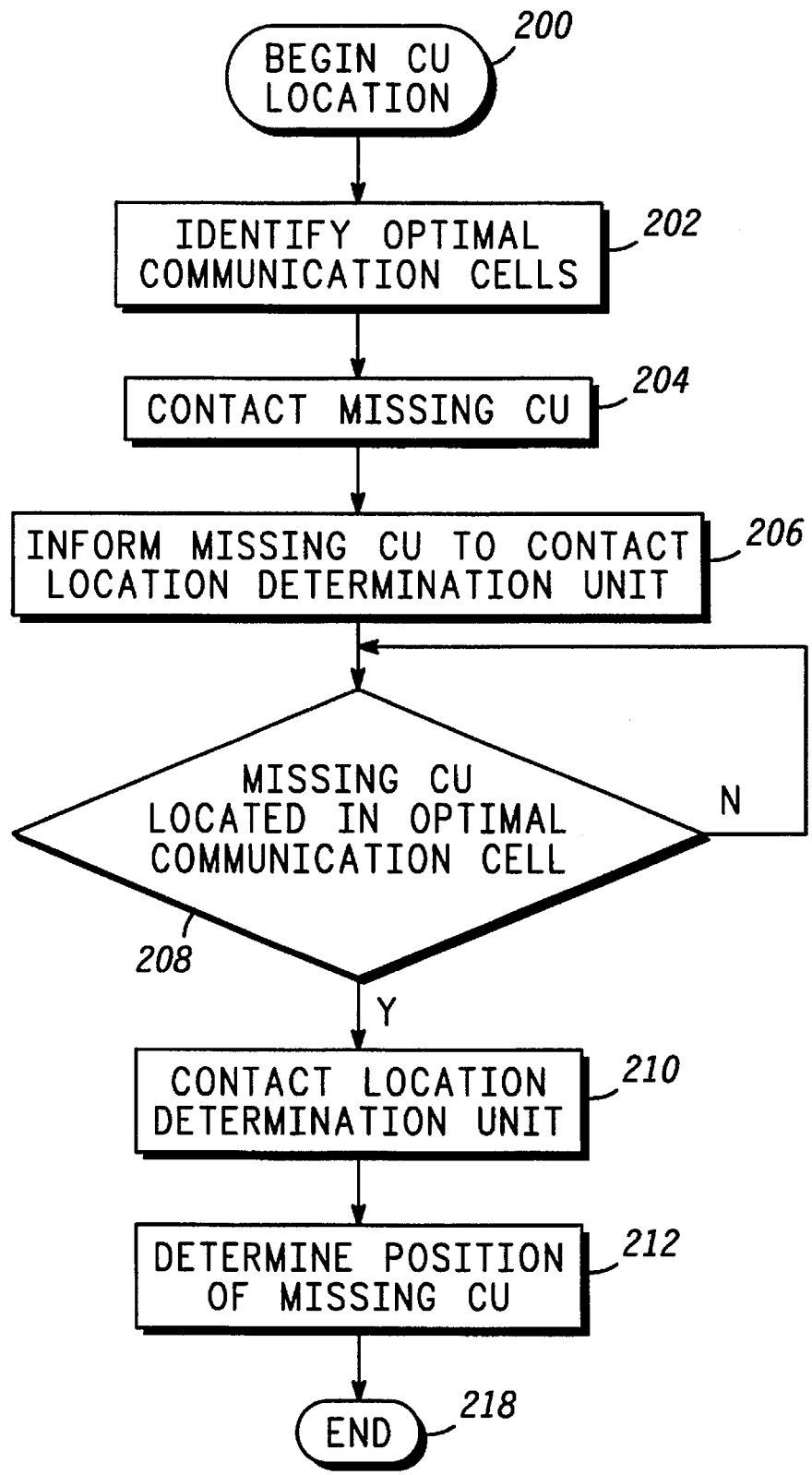
FIG. 6 illustrates a method for determining a communication unit location using the communication unit and a satellite in accordance with a preferred embodiment of the present invention.

FIG. 6 illustrates a method for determining a communication unit location using the communication unit (e.g., CU 26, FIG. 1) and a satellite (e.g., satellite 12, FIG. 1) in accordance with a preferred embodiment of the present invention. The method begins in step 200 by performing the step 202 of identifying optimal communication cells (e.g., cells 180, FIG. 5) for determining the location of the CU. The optimal communication cells are sufficiently close to the right-angle Doppler contour such that the position resolution error (see FIG. 3) is below an acceptable level.

In step 204, the CU that is to be located (referred to herein as the "missing CU") is contacted by the system. Once a communication link is established, in step 206 the system informs the missing CU to contact a location determination unit when the missing CU detects that it is located in an optimal communication cell. The location determination unit includes equipment capable of determining the CU location based on the time delay and Doppler readings. In a preferred embodiment, the location determination unit is located within a CF 24 (FIG. 1). However, in alternate embodiments, the location determination unit can be located in a satellite 12.

In a preferred embodiment, each CU has values stored in memory which indicate which cells are considered optimal. These values can be programmed into the CU memory in the factory or at a later time. In an alternate embodiment, the satellite may transmit the optimal cell values to the CU during step 206. At that time, the CU would store the optimal cell values in memory.

Because the satellites move relative to positions on the ground, their communication cells also move relative to the ground. In a preferred embodiment, an optimal communication cell will pass over every point on the ground multiple times a day. The CU waits in step 208 until it is located in an optimal communication cell. The satellite broadcasts channel information within each communication cell. This broadcast channel information contains a cell identifier which indicates the cell's relative position within the footprint projected by the satellite. In a preferred embodiment, the cell identifier is unique to each cell within the footprint, but is the same for identically positioned cells of different satellites.

The CU receives the cell identifier information. The CU then compares the cell identifier with one or more values stored in the CU memory that identify which communication cells are considered optimal. As described previously, the optimal cell values may be transmitted to the CU in step 206, or may be stored in the CU by an independent operation (e.g., by programming CU memory in the factory). When the cell identifier does not match any of the optimal cell values in the CU memory, the CU continues to wait.

When the cell identifier does match an optimal cell value in CU memory, the CU contacts the location determination unit in step 210. The CU transmits a message to a satellite which sends a message to the location determination unit indicating that the CU is located within an optimal communication unit. In a preferred embodiment, the location determination unit is located within the CF 24 (FIG. 1) and the message would be sent to the CF 24 by a satellite. In alternate embodiments, the location determination unit can be located in a satellite servicing the CU or another satellite. If the location determination unit is located on board the satellite servicing the CU, the message is simply transferred to the location determination unit.

In step 212, the location determination unit then determines the position of the missing CU. First, the CU 26 and the satellite 12 determine the time delay and Doppler between each other. Next, a measurement is taken of the time delay for a signal sent from the satellite to the CU and back. This measurement is multiplied by the transmission rate of the signal so that the CU distance can be determined. From this distance, a contour is created which indicates all points from the satellite at that distance at which the CU might be located. Because the cell in which the CU is located is known, the contour need only approximately span the width of the cell (including compensation for the relative movement of the cell).

Next, a Doppler reading between the satellite and the CU is taken, and a Doppler contour is determined. The intersection of the Doppler contour with the time delay contour is calculated. This intersection indicates the location of the CU. The method ends in step 218.

Both the time delay readings and the Doppler readings inherently contain errors. Thus, the location of the CU can be determined only to a certain degree of accuracy. The degree of accuracy depends on the proximity of the satellite to the CU, the velocity of the satellite, the accuracy of the measurement equipment, and other factors. In a preferred embodiment, a CU can be located within approximately one square kilometer.

The advantages to the method of the present invention are apparent from the position determination accuracy. Within a cell having an area of approximately 400 square kilometers, the CU is located to within one square kilometer without the need for expensive geolocation equipment associated with the CU. Thus, a relatively accurate determination of CU location is accomplished at very little cost. In some situations, the accuracy achieved using the method of FIG. 6 is sufficient to locate a missing CU. If more accuracy is desired, the CU position determination may be even further refined using the additional steps illustrated in FIGS. 7 and/or 9.

Figure 7:
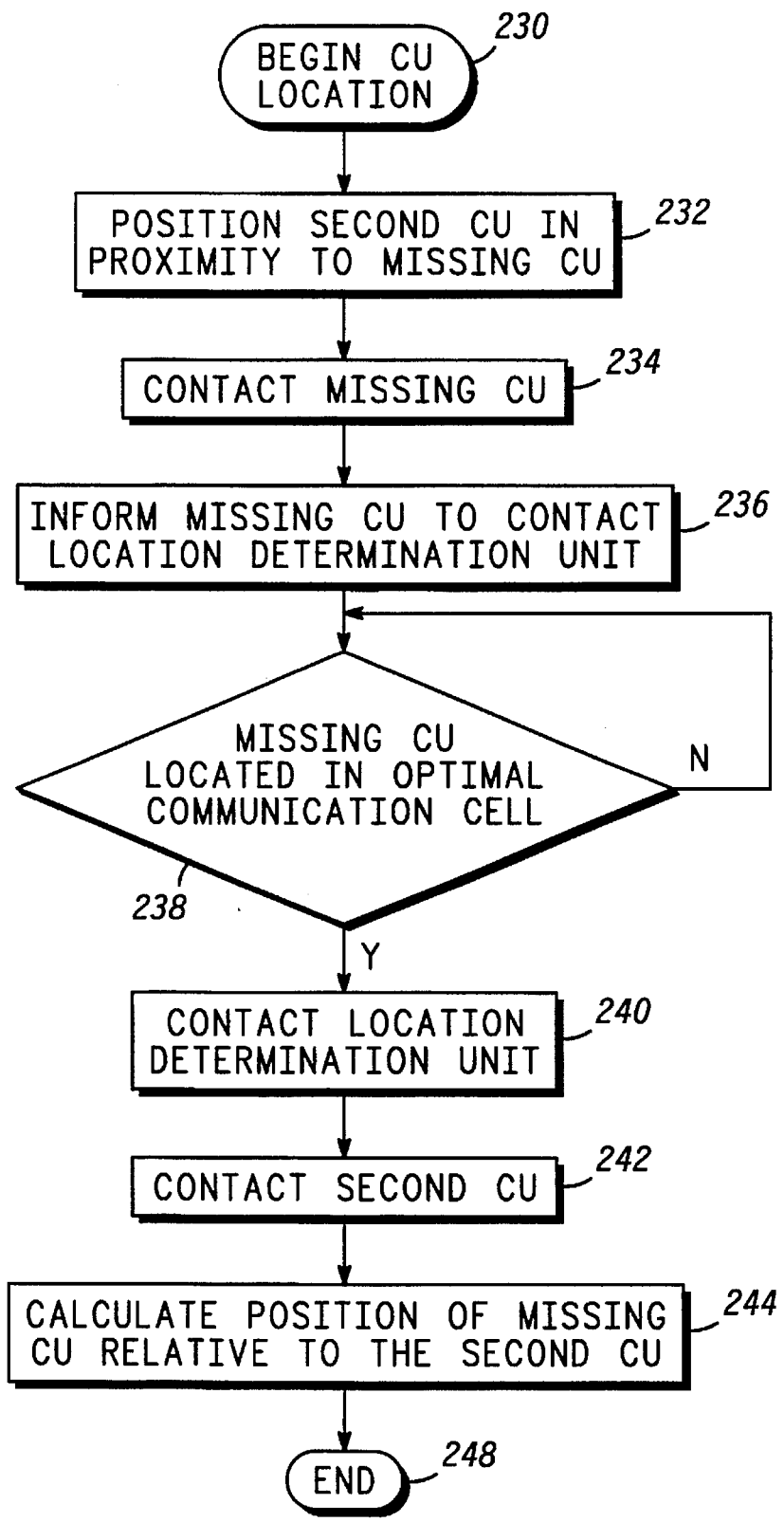
FIG. 7 illustrates a method for determining a communication unit location using the communication unit, a second communication unit, and a satellite in accordance with a preferred embodiment of the present invention.

FIG. 7 illustrates a method for determining a communication unit location using the communication unit, a second communication unit, and a satellite in accordance with a preferred embodiment of the present invention. The steps of FIG. 7 can be performed after performing the method as described in FIG. 6, or can be performed independently.

The method begins in step 230 by performing the step 232 of positioning a second CU in proximity to the missing CU. If the steps of FIG. 6 have been performed, then the second CU can be physically located at the missing CU location determined in step 212 (FIG. 6). If the steps of FIG. 6 have not been performed, the second CU can be positioned in a last known location. The last known location might have been reported to the communication system by the missing CU itself, or by a person who observed the missing CU at a particular location.

In step 234, the communication system contacts the missing CU. When a communication link is established, in step 236 the system informs the missing CU to contact a location determination unit when the missing CU detects that it is located in an optimal communication cell.

The CU waits in step 238 until it is located in an optimal communication cell. The CU receives the cell identifier information from the satellite broadcast information. The CU then compares the cell identifier with one or more values stored in the CU memory that identify which communication cells are considered optimal. When the cell identifier does not match any of the optimal cell values in the CU memory, the CU continues to wait. When the cell identifier does match an optimal cell value in CU memory, the CU contacts the location determination unit in step 240. Steps 234, 236, 238 and 240 need not be performed a second time if they have been recently performed in FIG. 6.

In step 242, the system then contacts the second CU. The location determination unit then determines the locations of the missing CU and the second CU in step 244 using methods such as those described in conjunction with step 212 (FIG. 6). The location of the missing CU so determined is a first approximation of the missing CU location.

From those positions, the system calculates the position of the missing CU relative to the second CU using geometric techniques well known to those of skill in the art. This relative position indicates the approximate direction and distance of the missing CU from the second CU, and thus is a more accurate second approximation of the missing CU location. The missing CU can be more accurately located by heading away from the second CU at the indicated direction for the indicated distance. The method then exits in step 248.

In a preferred embodiment, the second CU is mobile. In an alternate embodiment, the second CU can be stationary. For example, the second CU can be a "border beacon" whose position is known to a high degree of accuracy. In such an embodiment, the system can easily determine whether a missing CU is traveling on one side of a border or the other.

Figure 8:
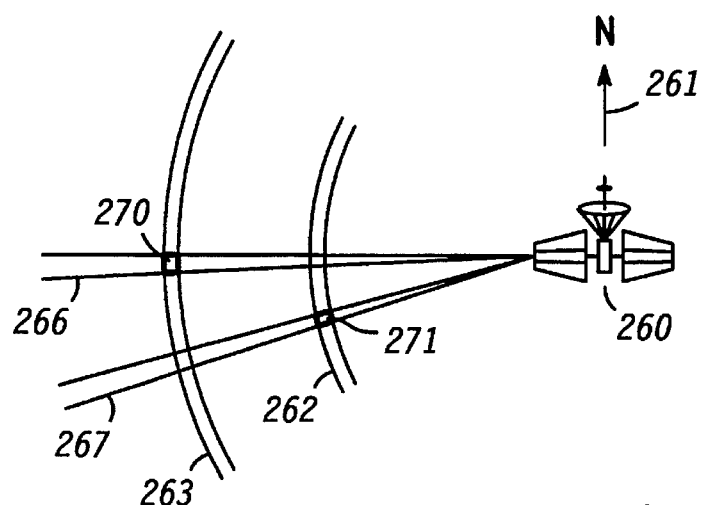
FIG. 8 illustrates position resolution error for constant delay and constant Doppler contours for a communication unit and a second communication unit in accordance with a preferred embodiment of the present invention.

FIG. 8 illustrates position resolution errors for constant delay and constant Doppler contours for the communication unit and the second communication unit in accordance with a preferred embodiment of the present invention. Satellite 260 is shown traveling in direction 261, which is approximately northward as indicated in FIG. 8. A missing CU might be located within area 270, for example, which is bounded by Doppler band 266 and time delay band 263. A second CU might be located within area 271 which is bounded by Doppler band 267 and time delay band. 262. From the approximate positions of the second CU and the missing CU, geometrical techniques can be used to determine the angle and distance of the missing CU from the second CU as described in FIG. 7. As is illustrated in FIG. 8, some error is still inherent in the position determination of the missing CU. For example, the position of the missing CU might have been narrowed to an apartment complex or a relatively small forested area. In some situations, the accuracy achieved is sufficient to locate the missing CU. Thus, position determination of the missing CU is achieved. If more accuracy is desired, the steps illustrated in FIG. 9 can be carried out to achieve an even more accurate determination of the missing CU location.

Figure 9:
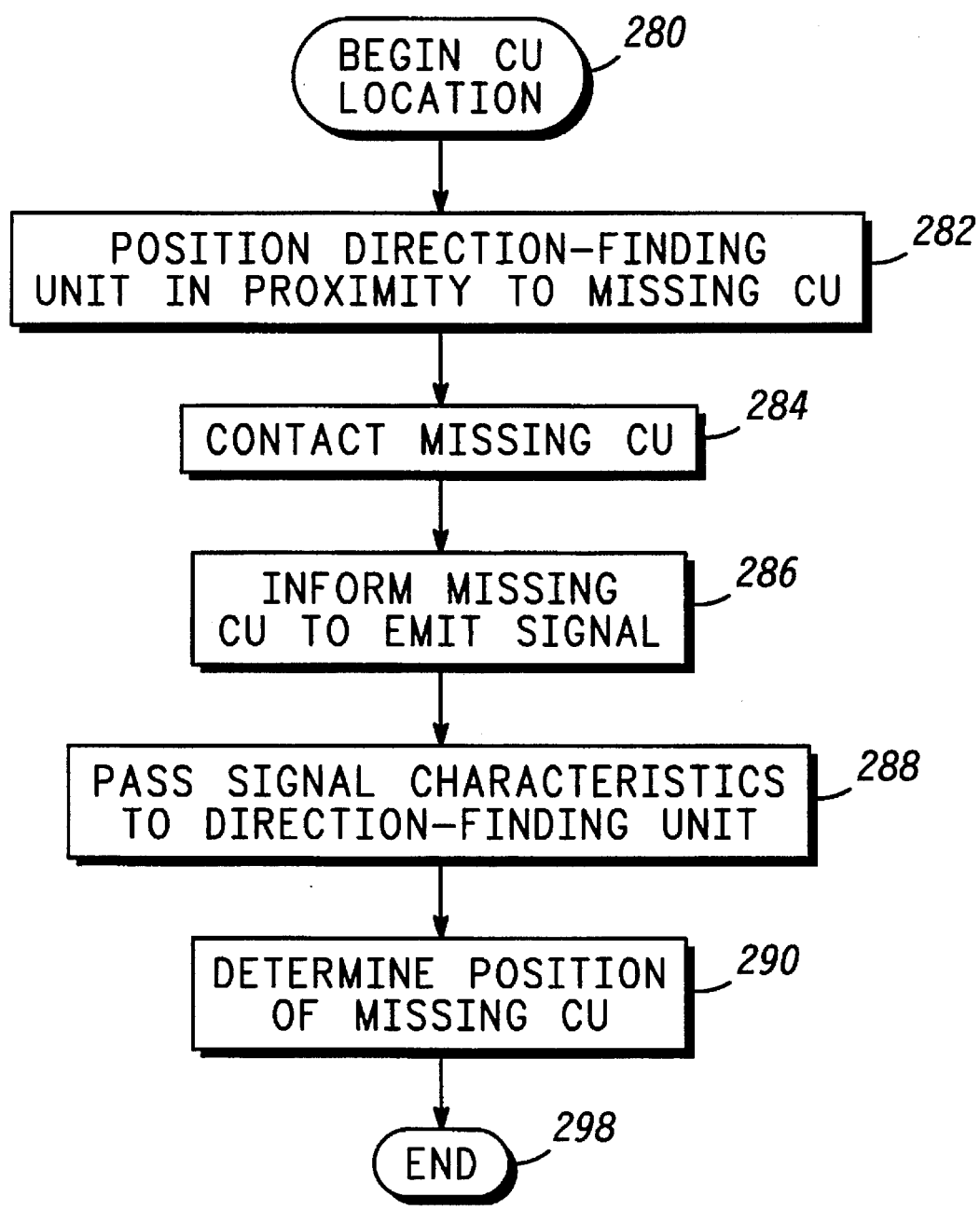
FIG. 9 illustrates a method for determining a communication unit location using the communication unit, a direction-finding unit, and a satellite in accordance with a preferred embodiment of the present invention.

FIG. 9 illustrates a method for determining a communication unit location using the communication unit, a direction-finding unit, and a satellite in accordance with a preferred embodiment of the present invention. In a preferred embodiment, the steps of FIG. 9 are performed after performing the steps of FIG. 6 and/or FIG. 7.

The method begins in step 280 by performing the step 282 of positioning a direction-finding unit in proximity to the position of the missing CU. The direction-finding unit is positioned at the estimated location of the missing CU calculated in either step 212 (FIG. 6) or step 244 (FIG. 7), for example.

In step 284, the missing CU is contacted by the system. Then, the missing CU is informed in step 286 to emit a signal (e.g., put up a carrier) that permits determination of the signal origin. In an alternate embodiment, where the missing CU continually emits a signal, steps 284 and 286 are not required.

In step 288, the characteristics of the signal are passed to the direction-finding unit by the system. For example, the frequency and time slot characteristics of the signal might be passed to the direction-finding unit. With this information, the direction-finding unit determines the position of the missing CU in step 290 using techniques well known to those of skill in the art. The method then ends in step 298.

Using the method illustrated in FIG. 9, an extremely precise determination of the missing CU location can be achieved. The accuracy of this determination is comparable to the accuracy achieved using a geolocation unit without the need for expensive geolocation equipment to be associated with the CU.

Figure 10:
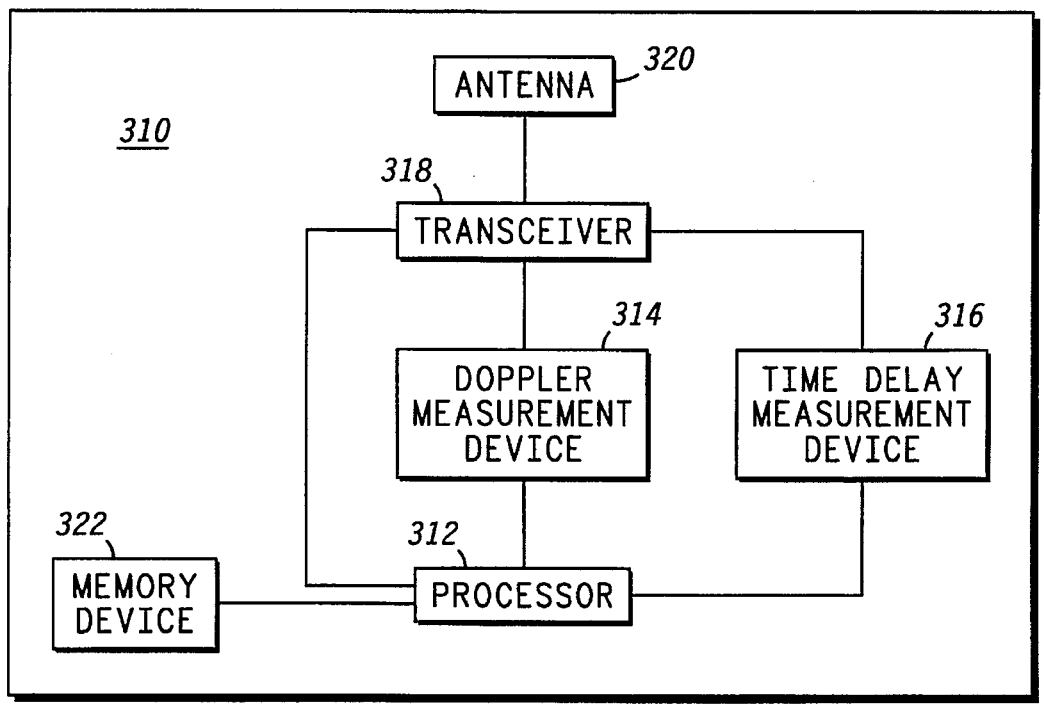
FIG. 10 illustrates a communication unit in accordance with a preferred embodiment of the present invention.

FIG. 10 illustrates a communication unit in accordance with a preferred embodiment of the present invention. Communication unit 310 has processor 312, Doppler measurement device 314, time delay measurement device 316, transceiver 318, antenna 320, and memory device 322. Processor 312 determines when CU 310 is located within an optimal communication cell and contacts the location determination unit as described in conjunction with FIGS. 6 and 7. Doppler measurement device 314 and time delay measurement device 316 are coupled to processor 312 and are designed to pre-correct Doppler and time shift errors, respectively, when corrections are received by transceiver 318 from a satellite. Transceiver 318 is coupled to processor 312, Doppler measurement device 314, time delay measurement device 316, and antenna 320. Transceiver 318 receives messages from a satellite (e.g., Doppler and time shift corrections, broadcast information, and messages to contact a location determination unit) via antenna 320. Memory device 322 is coupled to processor 312 and is used to store values indicating the optimal communication cells.

Figure 11:
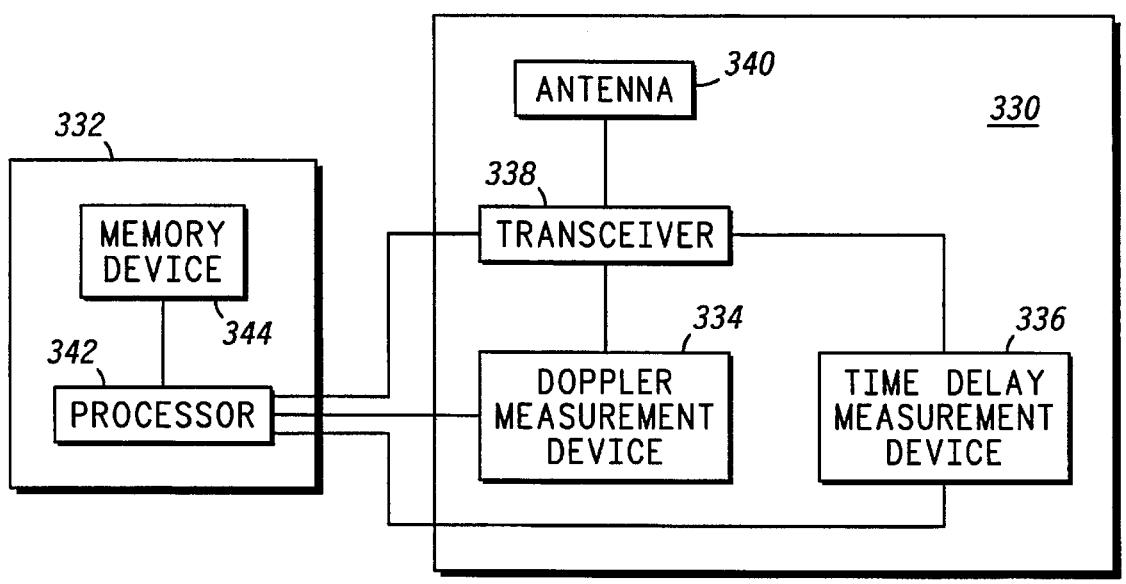
FIG. 11 illustrates a location determination unit in accordance with a preferred embodiment of the present invention.

FIG. 11 illustrates a location determination unit in accordance with a preferred embodiment of the present invention. Location determination unit comprises measurement unit 330 and processing unit 332 which communicate via link 346. Link 346 can be a direct, electrical connection, or may be a radio frequency link. Measurement unit 330 comprises Doppler measurement device 334, time delay measurement device 336, transceiver 338, and antenna 340. Doppler measurement device 334 and time delay measurement device 336 are designed to measure the Doppler and time error from nominal expected time and frequency, respectively, between a satellite 12 (FIG. 1) and a CU 26. Transceiver 338 is coupled to Doppler measurement device 334, time delay measurement device 336, and antenna 342. Processing unit 332 comprises processor 342 and memory device 344. Processor 342 determines the location of a communication unit by performing calculations associated with steps 212 (FIG. 6) and/or 244 (FIG. 7). Memory device 344 is coupled to processor 342 and is used to store data needed by processor 342 in carrying out its location determination calculations. Memory device 344 is optional when processor 342 has enough memory of its own to carry out the calculations.

In a preferred embodiment, measurement unit 330 is located in satellite 12 (FIG. 1) and processing unit 332 is located in CF 24. Thus, link 346 is a radio frequency link between units 330 and 332. In alternate embodiments, measurement unit 330 is located on-board satellite 12, and processing unit 332 is located on-board the same satellite 12, a different satellite 12, or another ground terminal.

In summary, a low-cost method and apparatus has been described for determining a location of a communication unit to a high degree of accuracy. The foregoing description of the specific embodiments will so fully reveal the general nature of the invention that others can, by applying current knowledge, readily modify or adapt for various applications such specific embodiments without departing from the generic concept and, therefore, such adaptations and modifications should and are intended to be comprehended within the meaning and range of equivalents of the disclosed embodiments. In particular, while a preferred embodiment has been described in terms of a satellite system, the method and apparatus of the present invention can be utilized for any system having a cellular device which travels along a predictable path.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method for locating a communication unit in a communication system comprising the communication unit, a satellite which projects multiple communication cells toward the communication unit and which moves relative to the communication unit, and a location determination unit, the method comprising the steps of:

a) informing the communication unit to contact the location determination unit when the communication unit is located within one of multiple optimal communication cells;

b) waiting until the communication unit is located within one of the multiple optimal communication cells;

c) when the communication unit is located within one of the multiple optimal communication cells, the location determination unit being contacted by the communication unit; and d) determining a location of the communication unit using a time delay between the communication unit and the satellite, and a Doppler reading between the communication unit and the satellite.

2. The method as claimed in claim 1 further comprising the steps of:

e) prior to the step of informing the communication unit, identifying the multiple optimal communication cells as those communication cells in which a location error falls below a predetermined threshold, the location error being based on time delay variables and Doppler reading variables;

f) during the step of informing the communication unit, sending values identifying the multiple optimal communication cells to the communication unit so that the values identifying the multiple optimal communication cells can be stored within the communication unit so the communication unit can determine whether the communication unit is located within one of the multiple optimal communication cells.

3. The method as claimed in claim 1 further comprising the steps to be performed prior to the step of informing the communication unit of:

e) identifying the multiple optimal communication cells as communication cells in which a location error falls below a predetermined threshold, the location error being based on time delay variables and Doppler reading variables.

4. The method as claimed in claim 1 further comprising the steps of:

e) positioning a direction-finding unit in a proximity to the location of the communication unit;

f) informing the communication unit in a proximity to the location of the communication unit;

f) informing the communication unit to send a signal;

g) receiving the signal by the direction-finding unit; and h) determining a closer approximation of the location of the communication unit from the singal.

5. The method as claimed in claim 1 wherein the step of waiting comprises the steps of:

b1) broadcasting, by the satellite, broadcast channel information for each of the multiple communication cells projected by the satellite, wherein the broadcast channel information comprises a cell identifier that is unique to each of the multiple communication cells;

b2) receiving, by the communication unit, the cell identifier contained within the broadcast channel information for a communication cell that the communication unit is located within;

b3) comparing the cell identifier with one or more values which identify the multiple optimal communication cells, wherein the values are stored within the communication unit;

b4) when the cell identifier does not match any of the values, repeating steps b1 through b3; and b5) when the cell identifier matches one of the values, proceeding to the step of contacting the location determination unit.

6. The method as claimed in claim 1 wherein the step of contacting the location determination unit comprises the steps of:

c1) transmitting a message to the satellite which indicates that the communication unit is located within one of the multiple optimal communication cells; and c2) sending the message by the satellite to the location determination unit.

7. The method as claimed in claim 1 wherein the step of determining the location comprises the steps of:

d1) measuring the time delay for a signal sent from the satellite to the communication unit and back;

d2) multiplying the time delay by a transmission rate of the signal to determine a distance contour for the communication unit relative to the satellite;

d3) taking the Doppler reading between the satellite and the communication unit to determine a Doppler contour for the communication unit relative to the satellite;

d4) calculating an intersection of the distance contour and the Doppler contour, and d5) determining the location of the communication unit as the intersection.

8. A method for locating a communication unit in a communication system comprising the communication unit, a satellite which projects multiple communication cells toward the communication unit and which moves relative to the communication unit, and a location determination unit, the method comprising the steps of:

a) receiving, by the communication unit, a message to contact the location determination unit when the communication unit is located within one of multiple optimal communication cells;

b) waiting until the communication unit is located within one of the multiple optimal communication cells; and c) when the communication unit is located within one of the multiple optimal communication cells, contacting the location determination unit.

9. The method as claimed in claim 8 wherein the step of waiting comprises the steps of:

b1) receiving broadcast channel information from the satellite for a communication cell that the communication unit is located within, wherein the broadcast channel information comprises a cell identifier that is unique to each of the multiple communication cells projected by the satellite;

b2) comparing the cell identifier with one or more values which identify the multiple optimal communication cells, wherein the values are stored within the communication unit;

b3) when the cell identifier does not match any of the values, repeating steps b1 through b2; and b4) when the cell identifier matches one of the values, proceeding to the step of contacting the location determination unit.

10. A method for locating a communication unit in a communication system comprising the communication unit, a satellite which projects multiple communication cells toward the communication unit and which moves relative to the communication unit, and a location determination unit, the method comprising the steps of:

a) informing the communication unit to contact the location determination unit when the communication unit is located within one of multiple optimal communication cells;

b) when the communication unit is located within one of the multiple optimal communication cells, receiving a message by the location determination unit from the communication unit; and c) determining a location of the communication unit using a time delay between the communication unit and the satellite, and a Doppler reading between the communication unit and the satellite.

11. The method as claimed in claim 10 wherein the step of determining the location comprises the steps of:

c1) measuring the time delay for a signal sent from the satellite to the communication unit and back;

c2) multiplying the time delay by a transmission rate of the signal to determine a distance contour for the communication unit relative to the satellite;

c3) taking the Doppler reading between the satellite and the communication unit to determine a Doppler contour for the communication unit relative to the satellite;

c4) calculating an intersection of the distance contour and the Doppler contour; and c5) determining the location of the communication unit as the intersection.

12. A method for locating a first communication unit in a communication system comprising the first communication unit, a second communication unit, a satellite which projects multiple communication cells toward the first communication unit and the second communication unit and which moves relative to the first communication unit, and a location determination unit, the method comprising the steps of:

a) informing the first communication unit to contact the location determination unit when the first communication unit is located within one of multiple optimal communication cells;

b) waiting until the first communication unit is located within one of the multiple optimal communication cells;

c) when the first communication unit is located within one of the multiple optimal communication cells, the location determination unit being contacted by the first communication unit;

d) determining a first approximation of a location of the first communication unit by using a first time delay between the first communication unit and the satellite, and a first Doppler reading between the first communication unit and the satellite;

e) contacting the second communication unit which is positioned in a proximity to the first communication unit;

f) determining a location of the second communication unit by using a second time delay between the second communication unit and the satellite, and a second Doppler reading between the second communication unit and the satellite; and g) determining a second approximation of the location of the first communication unit from the first approximation relative to the location of the second communication unit.

13. The method as claimed in claim 12 further comprising the steps of:

h) informing the first communication unit to send a signal;

i) receiving information describing the signal which was received by a direction-finding unit which is positioned in a proximity to the second approximation of the location of the first communication unit; and j) determining a third approximation of the location of the first communication unit from the information describing the signal.

14. The method as claimed in claim 12 wherein the step of contacting the second communication unit comprises the steps of:

e1) positioning the second communication unit in the proximity to the first communication unit by determining a last-known location of the first communication unit as a most recent location of the first communication unit reported to the communication system; and e2) physically locating the second communication unit nearby the last-known location.

15. The method as claimed in claim 12 wherein the step of determining the second approximation comprises the steps of:

h1) calculating a distance between the location of the second communication unit and the first approximation;

h2) computing an angle between the location of the second communication unit and the first approximation; and h3) determining the second approximation as a location situated at the distance and the angle from the second communication unit.

16. A method for locating a communication unit in a communication system comprising the communication unit, a direction-finding unit, a satellite which projects multiple communication cells toward the communication unit and which moves relative to the communication unit, and a location determination unit, the method comprising the steps of:

a) informing the communication unit to contact the location determination unit when the communication unit is located within one of multiple optimal communication cells;

b) waiting until the communication unit is located within one of the multiple optimal communication cells;

c) when the communication unit is located within one of the multiple optimal communication cells, the location determination unit being contacted by the communication unit;

d) determining a first approximation of a location of the communication unit using a time delay between the communication unit and the satellite, and a Doppler reading between the communication unit and the satellite;

e) receiving information describing a signal transmitted by the communication unit to a direction-finding unit which is positioned in a proximity to the first approximation of the location of the communication unit; and f) determining a second approximation of the location of the communication unit from the information describing the signal.

17. The method as claimed in claim 16 further comprising the step of informing the communication unit to send the signal.

18. A communication unit comprising:

a transceiver for receiving a message to contact a location determination unit when the communication unit is located within one of multiple optimal communication cells included with multiple communication cells projected by a satellite toward the communication unit, the transceiver also for receiving broadcast channel information from the satellite for a communication cell that the communication unit is located within, wherein the broadcast channel information comprises a cell identifier that is unique to each of the multiple communication cells projected by the satellite;

a processor coupled to the transceiver for comparing the cell identifier with one or more values which identify the multiple optimal communication cells, wherein the one or more values are stored within a memory device within the communication unit, the processor also for contacting the location determination unit when the cell identifier matches one of the one or more values; and the memory device coupled to the processor for storing the one or more values which identify the multiple optimal communication cells.

19. A location determination unit comprising:

a transceiver for informing a communication unit to contact the location determination unit when the communication unit is located within one of multiple optimal communication cells projected by a satellite toward the communication unit, the transceiver also for receiving a message from the communication unit when the communication unit is located within one of the multiple optimal communication cells; and a processor coupled to the transceiver for determining a location of the communication unit by
measuring a time delay for a signal sent from the satellite to the communication unit and back,
multiplying the time delay by a transmission rate of the signal to determine a distance contour for the communication unit relative to the satellite,
taking a Doppler reading between the satellite and the communication unit to determine a Doppler contour for the communication unit relative to the satellite,
calculating an intersection of the distance contour and the Doppler contour, and
determining the location of the communication unit as the intersection.

* * * * *

UNITED STATES PATENT AND TRADEMARK OFFICE
CERTIFICATE OF CORRECTION

PATENT NO. : 5,592,175
DATED : January 7, 1997
INVENTOR(S) : Daniel R. Tayloe

It is certified that error appears in the above-identified patent and that said Letters Patent is hereby corrected as shown below:

In column 10, claim 4, line 25/26, delete "f) informing the communication unit in a proximity to the location of the communication unit;"

Signed and Sealed this

Ninth Day of September, 1997

*Attest:*

BRUCE LEHMAN

*Attesting Officer*   Commissioner of Patents and Trademarks